W. B. Morrison,
Bread Machine.
No. 69,467. Patented Oct. 1, 1867.
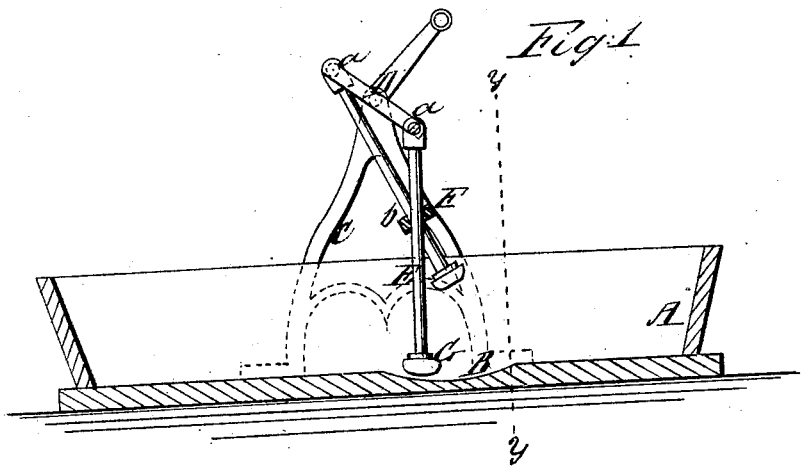
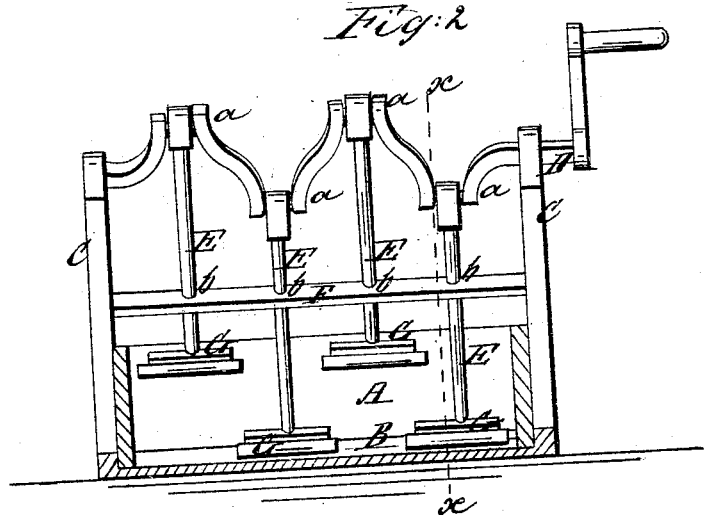
Witnesses.
J. Alison Fraser
Alex F. Roberts.
Inventor
W. B. Morrison
Per Munn & Co
Attorneys

United States Patent Office.

W. B. MORRISON, OF MUSKEGON MICHIGAN.

Letters Patent No. 69,467, dated October 1, 1867.

IMPROVED DOUGH-KNEADER.

*The Schedule referred to in these Letters Patent and making part of the same.*

TO ALL WHOM IT MAY CONCERN:

Be it known that I, W. B. MORRISON, of Muskegon, in the county of Muskegon, and State of Michigan, have invented a new and improved Machine for Kneading Dough; and I do hereby declare that the following is a full, clear, and exact description thereof, which will enable others skilled in the art to make and use the same, reference being had to the accompanying drawings, and to the letters of reference marked thereon.

This invention relates to a new and improved machine for kneading dough; and it consists in providing the bottom of a box or dough-receiver with a concave surface in or over which a series of plungers work, the latter being operated as hereinafter set forth. In the accompanying sheet of drawings- Figure 1 is a side sectional view of my invention taken in the line $x\ x$, fig. 2.

Figure 2, a transverse vertical section of the same, taken in the line $y\ y$, fig. 1.

Similar letters of reference indicate like parts.

A represents a box or dough-receiver, constructed of any suitable dimensions, and hvaing a concave surface, B, formed in its bottom, and extending entirely across it. To each side of the box A there is attached a standard, C, the upper ends of which form bearings for a shaft, D, which is provided with a series of cranks, $a$, four being shown in fig. 2, and having alternately opposite positions. Each crank $a$ has an arm or rod, E, attached to it, and these arms or rods pass through holes $b$ in a horizontal bar, F, which is attached to the standards C, each arm or rod having a shoe, G, attached. As the shaft D is rotated, motion is given the arms or rods E, and the shoes G work over the concave surface B in the bottom of the box and operate upon the dough in the concave, effectually kneading the same. Owing to the relative position of the cranks $a$ with each other, two shoes G descend and act upon the dough while the other two shoes rise. The device is very simple and efficient, and may be driven by any power. It is designed to have them constructed on a large scale, to be operated by steam or horse-power, and also constructed on a small scale, for hand operation.

Having thus described my invention, I claim as new, and desire to secure by Letters Patent—

The box A, provided with a concave surface, B, in its bottom, in combination with the arms or rods E, having shoes G attached, and operated from a crank-shaft, D, substantially as and for the purpose specified.

W. B. MORRISON.

Witnesses:
EDWIN POTTER,
LESLEY S. WINS.